(12) United States Patent
Gao

(10) Patent No.: US 10,820,279 B2
(45) Date of Patent: Oct. 27, 2020

(54) POWER DISTRIBUTION METHOD AND APPARATUS

(71) Applicant: China Academy of Telecommunications Technology, Beijing (CN)

(72) Inventor: Xuejuan Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/337,939

(22) PCT Filed: Jun. 30, 2017

(86) PCT No.: PCT/CN2017/091165
§ 371 (c)(1),
(2) Date: Mar. 29, 2019

(87) PCT Pub. No.: WO2018/059040
PCT Pub. Date: Apr. 5, 2018

(65) Prior Publication Data
US 2019/0230602 A1    Jul. 25, 2019

(30) Foreign Application Priority Data

Sep. 29, 2016  (CN) .......................... 2016 1 0866527
Mar. 24, 2017  (CN) .......................... 2017 1 0186416

(51) Int. Cl.
*H04W 52/14*    (2009.01)
*H04W 52/36*    (2009.01)
(Continued)

(52) U.S. Cl.
CPC ............. *H04W 52/146* (2013.01); *H04J 3/16* (2013.01); *H04L 5/0048* (2013.01);
(Continued)

(58) Field of Classification Search
CPC . H04W 52/00; H04W 52/146; H04W 52/346; H04W 52/367; H04W 52/38;
(Continued)

(56) References Cited

U.S. PATENT DOCUMENTS 8,204,007 B2 *  6/2012  Terry ..................... H04W 72/14
                                                    370/329
9,288,714 B2 *  3/2016  Lucky ..................... H04L 47/36
(Continued)

FOREIGN PATENT DOCUMENTS

CN    101415227 A    4/2009
CN    105407524 A    3/2016
(Continued)

OTHER PUBLICATIONS

"PUSCH design for short TTI", 3GPP TSG RAN WG1 Meeting #86, R1-166153, Gothenburg, Sweden, Aug. 22-26, 2016, 3 pages.
(Continued)

*Primary Examiner* — Candal Elpenord
(74) *Attorney, Agent, or Firm* — Kilpatrick Townsend & Stockton, LLP

(57) ABSTRACT

Disclosed in the present application are a power distribution method and apparatus, used for enabling simultaneous transmission by communication channels using TTI of different lengths by means of controlling the transmission power of the transmission channels respectively using TTI of different lengths to not surpass the permitted maximum transmission power of a device. The method comprises: determining the sum of the transmission powers of an uplink channel using a first TTI length for transmission and of an uplink channel using a second TTI length for transmission in a sub-frame; and when the sum surpasses the permitted maximum transmission power of a device, implementing power distribution according to a predetermined rule, such that the sum does (Continued)

Determine the sum of transmit power of a channel transmitted in a first TTI length, and a channel transmitted in a second TTI length in a sub-frame — S101

Allocate power under a preset rule when the sum exceeds the highest transmit power allowable for a UE, so that the sum does not exceeds the highest transmit power allowable for the UE — S102 not surpass the permitted maximum transmission power of the device.

14 Claims, 7 Drawing Sheets

(51) Int. Cl.
| | | |
|---|---|---|
| *H04W 52/38* | (2009.01) | |
| *H04W 52/34* | (2009.01) | |
| *H04W 72/04* | (2009.01) | |
| *H04L 5/00* | (2006.01) | |
| *H04J 3/16* | (2006.01) | |
| *H04W 52/32* | (2009.01) | |

(52) U.S. Cl.
CPC ......... *H04L 5/0053* (2013.01); *H04W 52/346* (2013.01); *H04W 52/367* (2013.01); *H04W 52/38* (2013.01); *H04W 72/04* (2013.01)

(58) Field of Classification Search
CPC ... H04W 74/006; H04W 72/02; H04W 72/04; H04W 72/042; H04L 5/0007; H04L 5/0048; H04L 5/0053; H04L 5/0091; H04L 27/26; H04J 3/16
See application file for complete search history.

(56) References Cited

U.S. PATENT DOCUMENTS

| | | | |
|---|---|---|---|
| 2015/0085797 A1 | 3/2015 | Ji et al. | |
| 2016/0205631 A1 | 7/2016 | Chen et al. | |
| 2016/0323887 A1* | 11/2016 | Patel | ................. H04W 52/365 |
| 2018/0049206 A1* | 2/2018 | Yerramalli | ........ H04W 72/0413 |
| 2018/0227861 A1* | 8/2018 | Byun | ................ H04W 72/0473 |
| 2019/0007943 A1* | 1/2019 | Takeda | .............. H04W 72/0446 |
| 2019/0116611 A1* | 4/2019 | Lee | ................... H04W 72/1278 |
| 2019/0159138 A1* | 5/2019 | Lee | ..................... H04W 52/146 |
| 2019/0174432 A1* | 6/2019 | Wang | .................... H04L 5/0048 |
| 2019/0174493 A1* | 6/2019 | Horiuchi | ........... H04W 72/0446 |

FOREIGN PATENT DOCUMENTS

| | | |
|---|---|---|
| JP | 2019510441 A | 4/2019 |
| WO | 2016114889 A1 | 7/2016 |
| WO | 2017173177 A1 | 10/2017 |

OTHER PUBLICATIONS

"Simultaneous Transmissions of UL Signals for Shortened TTI Operation", 3GPP TSG RAN WG1 Meeting #86, R1-167019, Gothenburg, Sweden Aug. 22-26, 2016, 5 pages.

"Discusssion on NR operation in unlicensed spectrum", 3GPP TSG RAN WG1 Meeting #86, R1-167089, Göteborg, Sweden, Aug. 22-26, 2016, 7 pages.

Panasonic, "UL simultaneous transmission between sTTI and TTI", R1-166968, 3GPP TSG RAN WG1 Meeting #86, Gothenburg, Sweden, 20160822-20160826.

"3 Generation Partnership Project; Technical Specification Group Radio Access Network; Evolved Universal Terrestrial Radio Access (E-UTRA); Physical layer procedures (Release 13)", 3GPP Standard; 3GPP TS 36.213, 3rd Generation Partnership Project (3GPP), vol. RAN WGI, No. V13.2.0, Jun. 30, 2016.

Huawei et al, "PUSCH design for short TTI", R1-166153, 3rd Generation Partnership Project (3GPP), Gothenburg, Sweden, 20160822-20160826.

* cited by examiner

Determine the sum of transmit power of a channel transmitted in a first TTI length, and a channel transmitted in a second TTI length in a sub-frame — S101

Allocate power under a preset rule when the sum exceeds the highest transmit power allowable for a UE, so that the sum does not exceeds the highest transmit power allowable for the UE — S102

POWER DISTRIBUTION METHOD AND APPARATUS

CROSS-REFERENCES TO RELATED APPLICATIONS

This application is a US National Stage of International Application No. PCT/CN2017/091165, filed on Jun. 30, 2017, designating the United States, and claiming the benefits of Chinese Patent Application No. 201610866527.1, filed with the Chinese Patent Office on Sep. 29, 2016, and entitled "A method and apparatus for allocating power", and Chinese Patent Application No. 201710186416.0, filed with the Chinese Patent Office on Mar. 24, 2017, and entitled "A method and apparatus for allocating power", both of which are hereby incorporated by reference in their entireties.

FIELD

The present application relates to the field of communications, and particularly to a method and apparatus for allocating power.

BACKGROUND

As there is a growing demand for mobile communication services, multiple organizations have defined higher user-plane delay performance as required for future mobile communication systems. A user-plane delay is generally shortened by reducing the length of a Transmission Time Interval (TTI) to support short-TTI transmission.

FIG. 1 illustrates the Frame Structure type 1 (FS1) for the existing Long Term Evolution (LTE) Frequency Division Duplex (FDD) system. In the FDD system, there are different carrier frequencies for uplink and downlink transmission, and there is the same frame structure for both uplink and downlink transmission. Over each carrier, a radio frame with the length of 10 ms includes ten 1 ms sub-frames, and each sub-frame includes two timeslots with the length of 0.5 ms. The length of time of a TTI for uplink and downlink data transmission is 1 ms.

FIG. 2 illustrates the Frame Structure type 2 (FS2) for the existing LTE Time Division Duplex (TDD) system. In the TDD system, there are different sub-frames or timeslots, at the same frequency, for uplink and downlink transmission. In the FS2, each 10 ms radio frame includes two 5 ms half-frames, and each half-frame includes five sub-frames with the length of 1 ms. The sub-frames in the FS2 are categorized into downlink, uplink, and special sub-frames, and each sub-frame includes three components of a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame.

Short-TTI transmission is a typical operating mode, that is, there are a plurality of short-TTI transmission shorter than 1 ms in a sub-frame structure defined in the existing LTE mechanism. A shorten Physical Uplink Shared Channel (sPUSCH) and a shorten Physical Uplink Control Channel (sPUCCH) are supported in the uplink, where the sPUCCH can carry at least Acknowledgement (ACK)/Negative Acknowledgement (NACK) feedback information for downlink transmission in a short TTI. The length of the short TTI may be two, three, four, or seven Orthogonal Frequency Division Multiplex (OFDM) or Single Carrier Frequency Division Multiple Access (SC-FDMA) symbols, but may alternatively be no more than 14 symbols, or a length of time of no more than 1 ms.

In summary, since there has been absent a definite solution to power control when transmit power is limited, short-TTI transmission, and transmission in a legacy TTI (a 1 ms TTI) cannot be performed concurrently in the prior art; for example, an sPUCCH and a PUSCH/PUCCH (transmission in a 1 ms TTI) cannot be transmitted concurrently in the same sub-frame, and an sPUSCH and a PUCCH/PUSCH cannot be transmitted concurrently in the same sub-frame, in the prior art.

SUMMARY

Embodiments of the application provide a method and apparatus for allocating power so as to control transmit power of transmission channels respectively with different TTI lengths not to exceed the highest transmit power allowable for a UE so that the transmission channels with the different TTI lengths can be transmitted concurrently to thereby improve the performance of a network.

An embodiment of the application provides a method for allocating power, the method including: determining the sum of transmit power of a channel transmitted in a first TTI length, and a channel transmitted in a second TTI length in a sub-frame; and allocating power under a preset rule when the sum exceeds the highest transmit power allowable for a UE, so that the sum does not exceeds the highest transmit power allowable for the UE.

With this method, the sum of transmit power of a channel transmitted in a first TTI length, and a channel transmitted in a second TTI length in a sub-frame is determined; and power is allocated under a preset rule when the sum exceeds the highest transmit power allowable for a UE, so that the sum does not exceeds the highest transmit power allowable for the UE. In this way, transmission channels with different TTI lengths can be transmitted concurrently, and total transmit power of the transmission channels with the different TTI lengths does not exceed the highest transmit power allowable for the UE, thus improving the performance of a network.

In one embodiment the first TTI length is longer than the second TTI length.

In one embodiment the first TTI length is 1 ms, and the second length is less than 1 ms, or both the first TTI length and the second TTI length are less than 1 ms.

In one embodiment the channel transmitted in the first TTI length and the channel transmitted in the second TTI length are uplink channels.

In one embodiment the channel transmitted in the first TTI length is an uplink control channel or an uplink shared channel, and the channel transmitted in the second TTI length is an uplink control channel or an uplink shared channel.

In one embodiment the allocating power under the preset rule includes: allocating transmit power preferentially for the channel transmitted in the first TTI length, and reducing transmit power of the channel transmitted in the second TTI length; or allocating transmit power respectively for the channel transmitted in the first TTI length, and the channel transmitted in the second TTI length according to a start time of the channel transmitted in the first TTI length, and a start time of the channel transmitted in the second TTI length, in the same sub-frame.

In one embodiment the allocating transmit power respectively for the channel transmitted in the first TTI length, and the channel transmitted in the second TTI length according to the start time of the channel transmitted in the first TTI length, and the start time of the channel transmitted in the second TTI length, in the same sub-frame includes, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame: allocating transmit power preferentially for the channel with an earlier start time, and reducing transmit power of the channel with a later start time; or reusing a power control scheme in the Power Control Mode (PCM) 2 with dual connectivity in the LTE Rel-12.

In one embodiment the allocating transmit power respectively for the channel transmitted in the first TTI length, and the channel transmitted in the second TTI length according to the start time of the channel transmitted in the first TTI length, and the start time of the channel transmitted in the second TTI length, in the same sub-frame includes, when the start time of the channel transmitted in the first TTI length is the same as the start time of the channel transmitted in the second TTI length, or the difference between the start time of the channel transmitted in the first TTI length, and the start time of the channel transmitted in the second TTI length is not larger than a preset threshold, in the same sub-frame: allocating transmit power preferentially for the channel transmitted in the second TTI length, and reducing transmit power of the channel transmitted in the first TTI length; or reusing a PCM1 power control scheme with dual-connectivity in the LTE Rel-12; or allocating power according to the PCM1 power control scheme with dual-connectivity in the LTE Rel-12 together with the priorities of TTI lengths; or allocating transmit power respectively for the channel transmitted in the first TTI length, and the channel transmitted in the second TTI length, according to the type of the channel transmitted in the first TTI length and/or the type of carried Uplink Control Information (UCI) thereof, and the type of the channel transmitted in the second TTI length and/or the type of carried UCI thereof.

In one embodiment allocating transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof includes: when the type of the channel transmitted in the first TTI length is different from the type of the channel transmitted in the second TTI length, allocating transmit power preferentially for the channel transmitted in the second TTI length, and reducing transmit power of the channel transmitted in the first TTI length, or allocating transmit power preferentially for an uplink control channel, and reducing transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, allocating transmit power respectively for the channel transmitted in the first TTI length, and the channel transmitted in the second TTI length according to the priorities of carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, reducing transmit power of the channel transmitted in the first TTI length, and transmit power of the channel transmitted in the second TTI length by the same factor; or when the type of the channel transmitted in the first TTI length is the same as the type of the channel transmitted in the second TTI length, reducing transmit power of the channel transmitted in the first TTI length, and transmit power of the channel transmitted in the second TTI length by the same factor, or allocating transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, allocating transmit power respectively for the channel transmitted in the first TTI length, and the channel transmitted in the second TTI length according to the priorities of carried UCI thereof.

In one embodiment for a channel for which transmit power is to be reduced, reduce transmit power of all the symbols in the channel.

An embodiment of the application provides an apparatus for allocating power, the apparatus including: a first unit configured to determine the sum of transmit power of a channel transmitted in a first TTI length, and a channel transmitted in a second TTI length in a sub-frame; and a second unit configured to allocate power under a preset rule when the sum determined by the first unit 11 exceeds the highest transmit power allowable for a UE, so that the sum does not exceeds the highest transmit power allowable for the UE.

In one embodiment the first TTI length is longer than the second TTI length.

In one embodiment the first TTI length is 1 ms, and the second length is less than 1 ms, or both the first TTI length and the second TTI length are less than 1 ms.

In one embodiment the channel transmitted in the first TTI length and the channel transmitted in the second TTI length are uplink channels.

In one embodiment the channel transmitted in the first TTI length is an uplink control channel or an uplink shared channel, and the channel transmitted in the second TTI length is an uplink control channel or an uplink shared channel.

In one embodiment the first unit is configured: to allocate transmit power preferentially for the channel transmitted in the first TTI length, and to reduce transmit power of the channel transmitted in the second TTI length; or to allocate transmit power respectively for the channel transmitted in the first TTI length, and the channel transmitted in the second TTI length according to a start time of the channel transmitted in the first TTI length, and a start time of the channel transmitted in the second TTI length, in the same sub-frame.

In one embodiment the first unit configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame: to allocate transmit power preferentially for the channel with an earlier start time, and to reduce transmit power of the channel with a later start time; or to reuse a power control scheme in the PCM 2 with dual connectivity in the LTE Rel-12.

In one embodiment the first unit configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is the same as the start time of the channel transmitted in the second TTI length, or the difference between the start time of the channel transmitted in the first TTI length, and the start time of the channel transmitted in the second TTI length is not larger than a preset threshold, in the same sub-frame: to allocate transmit power preferentially for the channel transmitted in the second TTI length, and to reduce transmit power of the channel transmitted in the first TTI length; or to reuse a PCM1 power control scheme with dual-connectivity in the LTE Rel-12; or to allocate power according to the PCM1 power control scheme with dual-connectivity in the LTE Rel-12 together with the priorities of TTI lengths; or to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof.

In one embodiment the first unit configured to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof is configured: when the type of the channel transmitted in the first TTI length is different from the type of the channel transmitted in the second TTI length, to allocate transmit power preferentially for the channel transmitted in the second TTI length, and to reduce transmit power of the channel transmitted in the first TTI length, or to allocate transmit power preferentially for an uplink control channel, and to reduce transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, to reduce transmit power of the channel transmitted in the first TTI length, and transmit power of the channel transmitted in the second TTI length by the same factor; or when the type of the channel transmitted in the first TTI length is the same as the type of the channel transmitted in the second TTI length, to reduce transmit power of the channel transmitted in the first TTI length, and transmit power of the channel transmitted in the second TTI length by the same factor, or to allocate transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of carried UCI thereof.

In one embodiment for a channel for which transmit power is to be reduced, reduce transmit power of all the symbols in the channel.

An embodiment of the application provides an apparatus for allocating power, the apparatus including a processor, a memory, and a transceiver, wherein the transceiver is configured to receive and transmit data under the control of the processor, the memory is configured to store preset program, and the processor is configured to read and execute the program in the memory: to determine the sum of transmit power of a channel transmitted in a first TTI length, and a channel transmitted in a second TTI length in a sub-frame; and to allocate power under a preset rule when the sum exceeds the highest transmit power allowable for a UE, so that the sum does not exceeds the highest transmit power allowable for the UE.

In one embodiment the first TTI length is longer than the second TTI length.

In one embodiment the first TTI length is 1 ms, and the second length is less than 1 ms, or both the first TTI length and the second TTI length are less than 1 ms.

In one embodiment the channel transmitted in the first TTI length and the channel transmitted in the second TTI length are uplink channels.

In one embodiment the channel transmitted in the first TTI length is an uplink control channel or an uplink shared channel, and the channel transmitted in the second TTI length is an uplink control channel or an uplink shared channel.

In one embodiment the processor is configured: to allocate transmit power preferentially for the channel transmitted in the first TTI length, and to reduce transmit power of the channel transmitted in the second TTI length; or to allocate transmit power respectively for the channel transmitted in the first TTI length, and the channel transmitted in the second TTI length according to a start time of the channel transmitted in the first TTI length, and a start time of the channel transmitted in the second TTI length, in the same sub-frame.

In one embodiment the processor configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame: to allocate transmit power preferentially for the channel with an earlier start time, and to reduce transmit power of the channel with a later start time; or to reuse a power control scheme in the PCM 2 with dual connectivity in the LTE Rel-12.

In one embodiment the processor configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is the same as the start time of the channel transmitted in the second TTI length, or the difference between the start time of the channel transmitted in the first TTI length, and the start time of the channel transmitted in the second TTI length is not larger than a preset threshold, in the same sub-frame: to allocate transmit power preferentially for the channel transmitted in the second TTI length, and to reduce transmit power of the channel transmitted in the first TTI length; or to reuse a PCM1 power control scheme with dual-connectivity in the LTE Rel-12; or to allocate power according to the PCM1 power control scheme with dual-connectivity in the LTE Rel-12 together with the priorities of TTI lengths; or to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof.

In one embodiment the processor configured to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length, and/or the type of carried UCI thereof is configured: when the type of the channel transmitted in the first TTI length is different from the type of the channel transmitted in the second TTI length, to allocate transmit power preferentially for the channel transmitted in the second TTI length, and to reduce transmit power of the channel transmitted in the first TTI length, or to allocate transmit power preferentially for an uplink control channel, and to reduce transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, to reduce transmit power of the channel transmitted in the first TTI length, and transmit power of the channel transmitted in the second TTI length by the same factor; or when the type of the channel transmitted in the first TTI length is the same as the type of the channel transmitted in the second TTI length, to reduce transmit power of the channel transmitted in the first TTI length, and transmit power of the channel transmitted in the second TTI length by the same factor, or to allocate transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of carried UCI thereof.

In one embodiment for a channel for which transmit power is to be reduced, reduce transmit power of all the symbols in the channel.

In the method and apparatus for allocating power according to the embodiments of the application, the sum of transmit power of a channel transmitted in a first TTI length, and a channel transmitted in a second TTI length in a sub-frame is determined; and power is allocated under a preset rule when the sum exceeds the highest transmit power allowable for a UE, so that the sum does not exceeds the highest transmit power allowable for the UE. In this way, transmission channels with different TTI lengths can be transmitted concurrently, and total transmit power of the transmission channels with the different TTI lengths does not exceed the highest transmit power allowable for the UE, thus improving the performance of a network.

BRIEF DESCRIPTION OF THE DRAWINGS

In order to make the technical solutions according to the embodiments of the application more apparent, the drawings to which reference is to be made in the description of the embodiments will be introduced below in brief, and apparently the drawings in the following description are only some embodiments of the application, and those ordinarily skilled in the art can further derive from these drawings other drawings without any inventive effort.

DETAILED DESCRIPTION OF THE INVENTION

The embodiments of the application provide a method and apparatus for allocating power so as to control transmit power of transmission channels respectively with different TTI lengths not to exceed the highest transmit power allowable for a UE so that the transmission channels with the different TTI lengths can be transmitted concurrently to thereby improve the performance of a network.

There is the same TTI lengths of an sPUCCH and an sPUSCH in short-TTI transmission, but there may also be concurrent short-TTI transmission, and transmission in a legacy TTI (a 1 ms TTI), e.g., concurrent transmission of an sPUCCH and a PUSCH/PUCCH (transmission in a 1 ms TTI) in the same sub-frame, and concurrent transmission an sPUSCH and a PUCCH/PUSCH in the same sub-frame, and at this time, if power is limited, then power control will be performed, and a power allocation priority or principle will be defined, so that total power of concurrent short-TTI transmission and long-TTI transmission will not exceed the highest transmit power allowable for a UE.

Figure 1:
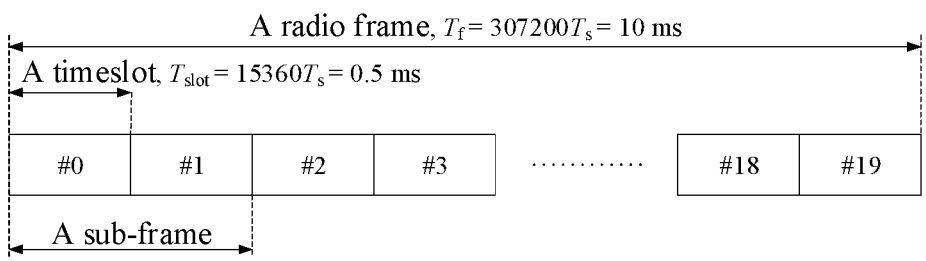
FIG. 1 is a schematic diagram of the frame structure type 1 in the prior art.
Figure 2:
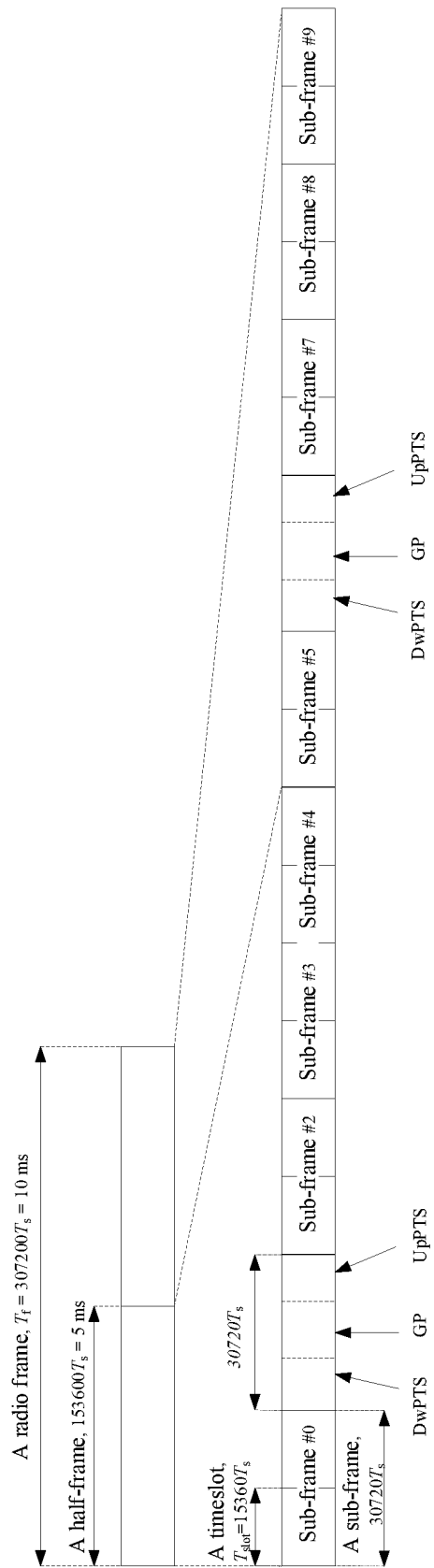
FIG. 2 is a schematic diagram of the frame structure type 2 (at a 5 ms switch-point periodicity) in the prior art.
Figures 3, 4:
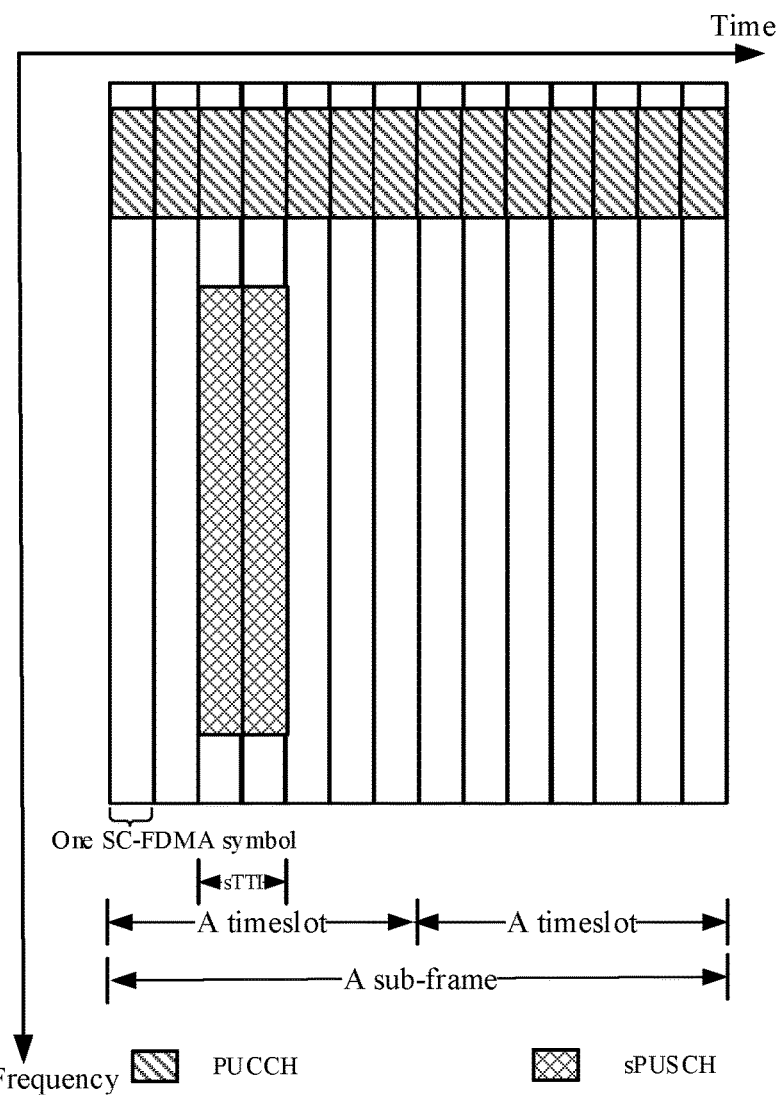
FIG. 3 is a schematic flow chart of a method for allocating power according to an embodiment of the application.
FIG. 4 is a schematic diagram of a first instance of overlapping transmission resources of transmission channels with different TTI lengths according to an embodiment of the application.

Referring to FIG. 3, a method for allocating power according to an embodiment of the application includes the following steps.

The step S101 is to determine the sum of transmit power of a channel transmitted in a first TTI length, and a channel transmitted in a second TTI length in a sub-frame.

Here a transmission resource to be occupied by the channel transmitted in the first TTI length, and a transmission resource to be occupied by the channel transmitted in the second TTI length partially overlap with each other in the same sub-frame.

The step S102 is to allocate power under a preset rule when the sum exceeds the highest transmit power allowable for a UE, so that the sum does not exceeds the highest transmit power allowable for the UE.

In one embodiment the first TTI length is longer than the second TTI length. For example, the first TTI is an existing normal TTI, and can also be referred to as a long TTI, and the second TTI can be referred to as a short TTI.

In one embodiment the first TTI length is 1 ms, and the second length is less than 1 ms, or both the first TTI length and the second TTI length are less than 1 ms.

In one embodiment the channel transmitted in the first TTI length and the channel transmitted in the second TTI length are uplink channels.

In one embodiment the embodiment of the application is also applicable to transmission of downlink channels.

In one embodiment the channel transmitted in the first TTI length is an uplink control channel or an uplink shared channel, and the channel transmitted in the second TTI length is an uplink control channel or an uplink shared channel.

In one embodiment power is allocated under the preset rule particularly as follows.

Transmit power is allocated preferentially for the channel transmitted in the first TTI length, and transmit power of the channel transmitted in the second TTI length is reduced.

Or transmit power is allocated respectively for the channel transmitted in the first TTI length, and the channel transmitted in the second TTI length according to a start time of the channel transmitted in the first TTI length, and a start time of the channel transmitted in the second TTI length, in the same sub-frame.

In one embodiment transmit power is allocated respectively for the channel transmitted in the first TTI length, and the channel transmitted in the second TTI length according to the start time of the channel transmitted in the first TTI length, and the start time of the channel transmitted in the second TTI length, in the same sub-frame as follows.

When the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame, transmit power is allocated preferentially for the channel with an earlier start time, and transmit power of the channel with a later start time is reduced; or a power control scheme in the PCM2 with dual connectivity in the LTE Rel-12 is reused.

Here the PCM2 power control scheme is defined for an asynchronous scenario, and power can be allocated, for example, according to the following priority.

When power is allocated across carrier groups, power is allocated preferentially for the channel with an earlier time; and moreover, the lowest guaranteed power is further defined for each carrier group, at least the lowest guaranteed power is allocated for each carrier group, and remaining power is further allocated according to the priority above; and here only the allocation scheme above according to the priority in the PCM2 power control scheme may be reused without defining the lowest guaranteed power; or the entire PCM2 power control scheme may be reused, that is, remaining power is allocated according to the priority above while defining the lowest guaranteed power.

In one embodiment transmit power is allocated respectively for the channel transmitted in the first TTI length, and the channel transmitted in the second TTI length according to the start time of the channel transmitted in the first TTI length, and the start time of the channel transmitted in the second TTI length, in the same sub-frame as follows.

When the start time of the channel transmitted in the first TTI length is the same as the start time of the channel transmitted in the second TTI length, or the difference between the start time of the channel transmitted in the first TTI length, and the start time of the channel transmitted in the second TTI length is not larger than a preset threshold, in the same sub-frame: transmit power is allocated preferentially for the channel transmitted in the second TTI length, and transmit power of the channel transmitted in the first TTI length is reduced; or a PCM1 power control scheme with dual-connectivity in the L Rel-12 is reused; or power is allocated according to a PCM1 power control scheme with dual-connectivity in the LTE Rel-12 together with the priorities of the TTI lengths; or transmit power is allocated respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof.

Here the PCM1 power control scheme is defined for a synchronous scenario (that is, the time instants are aligned, or the difference between them is not larger than a preset threshold), and power is allocated according to the following priority.

When power is allocated across different carrier groups, power is allocated in a priority order that a PUCCH carrying an SR=a PUCCH and/or a PUSCH carrying ACK/NACK>a PUCCH and/or a PUSCH carrying P-CSI>a PUSCH carrying no UCI>an SRS; when the same channel carries a plurality of kinds of UCI, the priority of the channel is defined according to the UCI at the highest priority; and for channels carrying the same kind of UCI, power is allocated according to the priorities of the carrier groups, where there is a higher priority of a carrier group including a PCC; and moreover, the lowest guaranteed power is further defined for each carrier group, at least the lowest guaranteed power is allocated for each carrier group, and remaining power is further allocated according to the priority above; and here only the allocation scheme above according to the priority in the PCM1 power control scheme may be reused without defining the lowest guaranteed power; or the entire PCM1 power control scheme may be reused, that is, remaining power is allocated according to the priority above while defining the lowest guaranteed power.

For power allocation according to the PCM1 power control scheme with dual-connectivity in the LTE Rel-12 together with the priorities of the TTI lengths, when power is allocated across different carrier groups in the PCM1, for example, for channels carrying the same kind of UCI, power is allocated according to the priorities of the TTI lengths instead of the priorities of the carrier groups, that is, transmit power is allocated preferentially for the channel or the carrier group transmitted in the second TTI length.

Of course, power can alternatively be allocated according to the other priority in the PCM1 above instead of the priorities of the TTI lengths, and for example, when power is allocated across different carrier groups, firstly power is allocated across the carrier groups according to the priorities of the TTI lengths, that is, firstly power is allocated preferentially for the carrier/carrier group with the second TTI length, and then power is allocated according to a priority order that a PUCCH>a PUSCH carrying UCI>a PUSCH carrying no UCI>an SRS in a carrier group.

Furthermore for the PCM1 and the PCM2 above, in the same carrier group, power is allocated according to a power allocation principle in a typical CA scenario, and for example, power is allocated according to a priority order that a PUCCH>a PUSCH carrying UCI>a PUSCH carrying no UCI>an SRS; and there is also concurrent transmission of uplink channels with different TTI lengths in the same carrier group, then one of them may be dropped, or an overlapping component of a channel with a longer TTI may be punctured to thereby avoid overlapping power.

In one embodiment transmit power is allocated respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof particularly as follows.

When the type of the channel transmitted in the first TTI length is different from the type of the channel transmitted in the second TTI length (regardless of which the type of UCI carried in the channel transmitted in the first TTI length is the same as the type of UCI carried in the channel transmitted in the second TTI length), transmit power is allocated preferentially for the channel transmitted in the second TTI length, and transmit power of the channel transmitted in the first TTI length is reduced, or transmit power is allocated preferentially for an uplink control channel, and transmit power of an uplink shared channel is reduced.

Or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, transmit power is allocated respectively for the channel transmitted in the first TTI length, and the channel transmitted in the second TTI length according to the priorities of the carried UCI thereof.

Or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, reduce transmit power of the channel transmitted in the first TTI length, and transmit power of the channel transmitted in the second TTI length by the same factor.

Or when the type of the channel transmitted in the first TTI length is the same as the type of the channel transmitted in the second TTI length (regardless of whether the type of UCI carried in the channel transmitted in the first TTI length is the same as the type of UCI carried in the channel transmitted in the second TTI length), reduce transmit power of the channel transmitted in the first TTI length, and transmit power of the channel transmitted in the second TTI length by the same factor; or transmit power is allocated preferentially for the channel transmitted in the second TTI length.

Or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, transmit power is allocated respectively for the channel transmitted in the first TTI length, and the channel transmitted in the second TTI length according to the priorities of the carried UCI thereof.

In one embodiment for a channel for which transmit power is to be reduced, transmit power of all the symbols in the channel is reduced.

For example, at the User Equipment (UE) side (the same will apply to the network side) in the uplink direction, for any sub-frame, it is determined whether the sum of transmit power of an uplink channel transmitted in a first TTI length, and an uplink channel transmitted in a second TTI length, in an overlapping transmission component in the sub-frame exceeds the highest transmit power allowable for the UE, where the overlapping transmission component is a transmission resource for both the uplink channel transmitted in the first TTI length, and the uplink channel transmitted in the second TTI length.

The first TTI length is longer than the second TTI length.
The first TTI length is 1 ms, and the second TTI length is a short TTI of no more than 1 ms, e.g., two, three, four, seven, etc., symbols.

Each of the uplink channels is at least one of uplink control channel and uplink shared channel.

It shall be noted that the technical solution according to the embodiment of the application can also be applicable to transmission of downlink channels.

When it is determined that the sum of transmit power of the uplink channel transmitted in the first TTI length, and the uplink channel transmitted in the second TTI length, in the overlapping transmission component in the sub-frame exceeds the highest transmit power allowable for the UE, transmit power is allocated according to a predetermined rule or priority so that total transmit power in the overlapping transmission component does not exceed the highest transmit power allowable for the UE.

For example, the predetermined rule or priority is as follows.

In a first scheme, power is always allocated preferentially for the uplink channel transmitted in the first TTI length, that is, transmit power of the uplink channel transmitted in the first TTI length is maintained, and transmit power of the uplink channel transmitted in the second TTI length is reduced.

In a second implementation: when there are different start times of the uplink channel transmitted in the first TTI length, and the uplink channel transmitted in the second TTI length, power is allocated preferentially for the uplink channel with an earlier start time (e.g., the uplink channel transmitted in the first TTI length), that is, transmit power of the uplink channel with an earlier start time is maintained, and transmit power of the uplink channel with a later start time is reduced.

When there is the same start time of the uplink channel transmitted in the first TTI length, and the uplink channel transmitted in the second TTI length: in a scheme 2-1, power is allocated preferentially for the uplink channel transmitted in the second TTI length, that is, transmit power of the uplink channel transmitted in the second TTI length is maintained, and transmit power of the uplink channel transmitted in the first TTI length is reduced; in a scheme 2-2, power is allocated preferentially for an uplink control channel, that is, transmit power of the uplink control channel (regardless of whether the uplink control channel is transmitted in the first TTI or the second TTI) is maintained, and transmit power of an uplink shared channel (regardless of whether the uplink control channel is transmitted in the first TTI or the second TTI) is reduced; and in a scheme 2-3, power of uplink channels of the same type is reduced by the same factor, and power of uplink channels of different types is controlled as described in the scheme 2-1 or 2-2.

When transmit power of an uplink channel is reduced, transmit power of all the symbols in the uplink channel is reduced.

In a particular embodiment, for example, the first TTI length is 1 ms, i.e., one sub-frame, and the second TTI length is two symbols.

The UE determines target transmit power of a PUCCH/PUSCH in the current sub-frame according to an uplink power control parameter preconfigured for the first TTI length, and a Transmit Power Control (TPC) parameter obtained for the first TTI length.

The UE determines target transmit power of an sPUCCH/sPUSCH in the current sub-frame according to an uplink power control parameter preconfigured for the second TTI length, and a TPC parameter obtained for the second TTI length.

As illustrated in FIG. 4, if the PUCCH and the sPUSCH overlap with each other, and have different start time instants, in the current sub-frame, then since there are different start time instants of the PUCCH and the sPUSCH, transmit power of the PUCCH will be maintained, and transmit power of the sPUSCH will be reduced, according to a time-first principle until total power in the overlapping component does not exceed the highest transmit power allowable for the UE.

Figure 5:
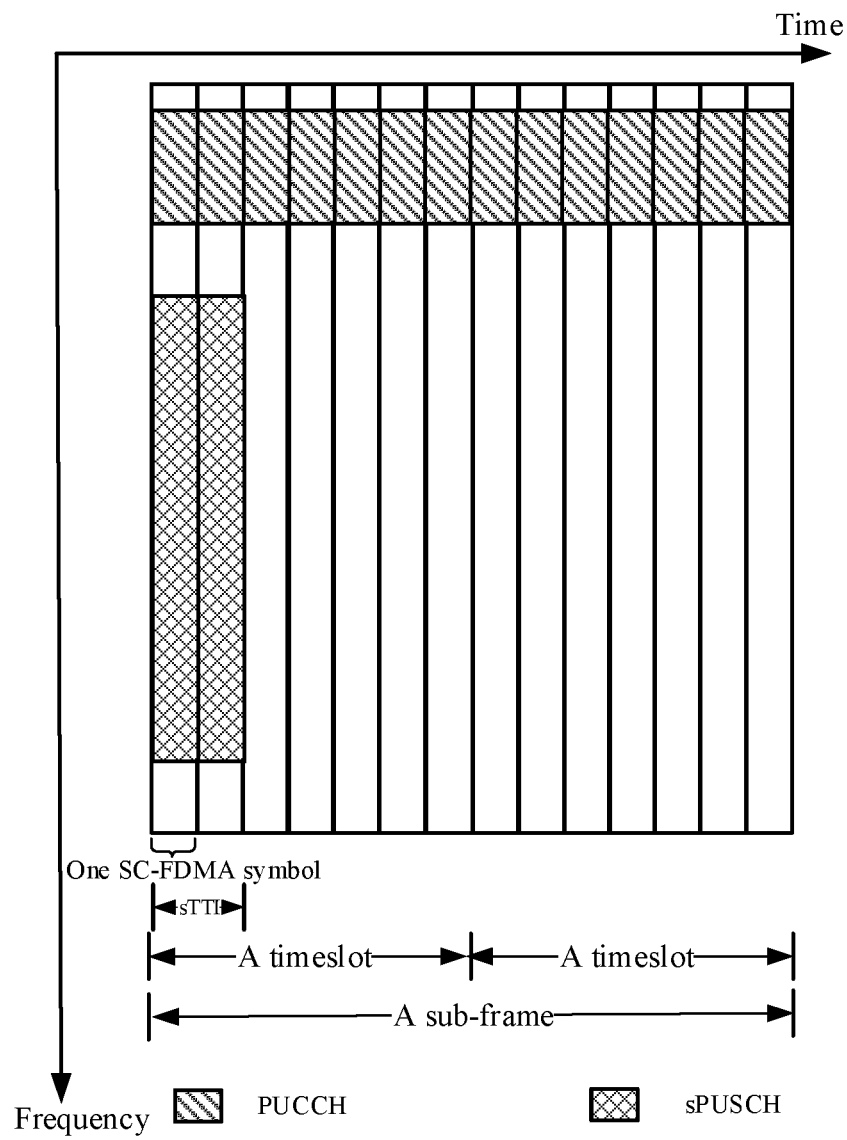
FIG. 5 is a schematic diagram of a second instance of overlapping transmission resources of transmission channels with different TTI lengths according to an embodiment of the application.

As illustrated in FIG. 5, if the PUCCH and the sPUSCH overlap with each other, and have the same start time instant, in the current sub-frame, then since there is the same start time instant of the PUCCH and the sPUSCH, in one implementation, transmit power of the sPUSCH will be maintained, and transmit power of the PUCCH will be reduced, according to a short-TTI-first principle until total power in the overlapping component does not exceed the highest transmit power allowable for the UE; and in another implementation, transmit power of the PUCCH will be maintained, and transmit power of the sPUSCH will be reduced, according to an uplink control channel-first principle until total power in the overlapping component does not exceed the highest transmit power allowable for the UE.

Figure 6:
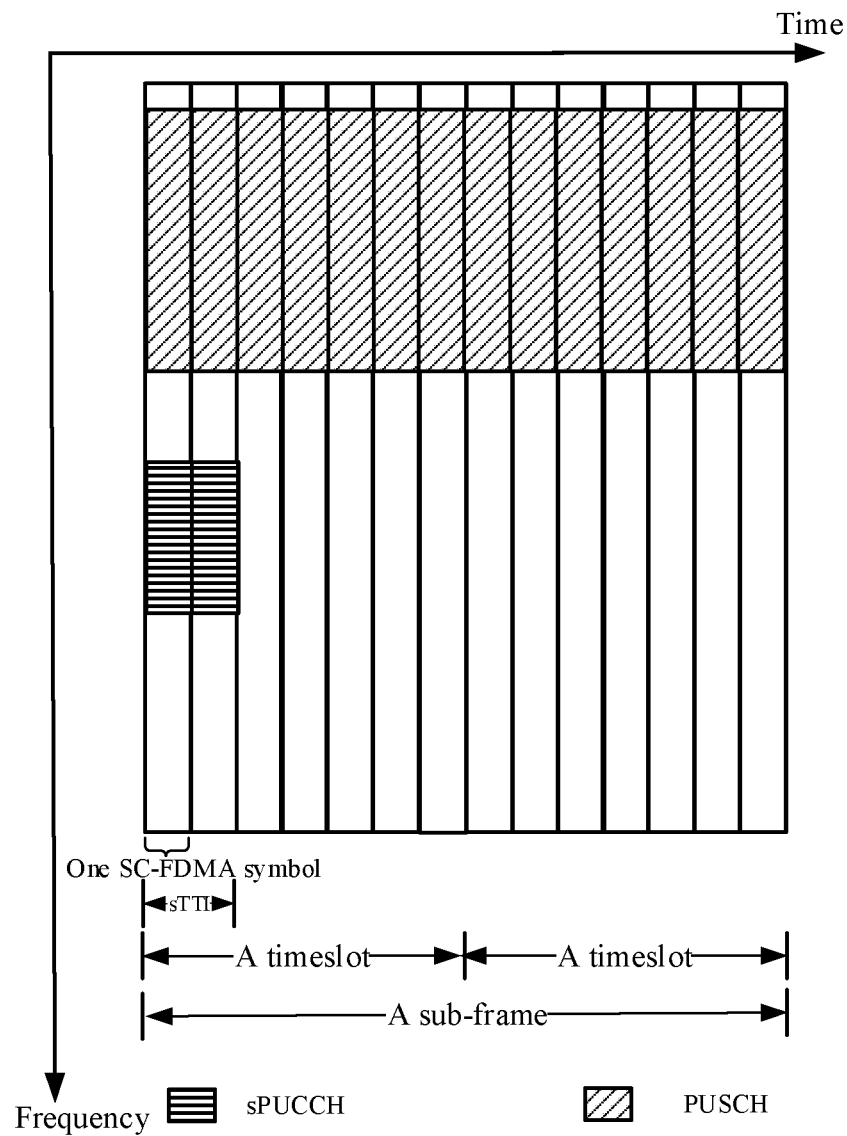
FIG. 6 is a schematic diagram of a third instance of overlapping transmission resources of transmission channels with different TTI lengths according to an embodiment of the application.

As illustrated in FIG. 6, if the sPUCCH and the PUSCH overlap with each other, and have the same start time instant, in the current sub-frame, then since there is the same start time instant of the sPUCCH and the PUSCH, in one implementation, transmit power of the sPUCCH will be maintained, and transmit power of the PUSCH will be reduced, according to a short-TTI-first principle until total power in the overlapping component does not exceed the highest transmit power allowable for the UE; and in another implementation, transmit power of the sPUCCH will be maintained, and transmit power of the PUSCH will be reduced, according to an uplink control channel-first principle until total power in the overlapping component does not exceed the highest transmit power allowable for the UE.

Figure 7:
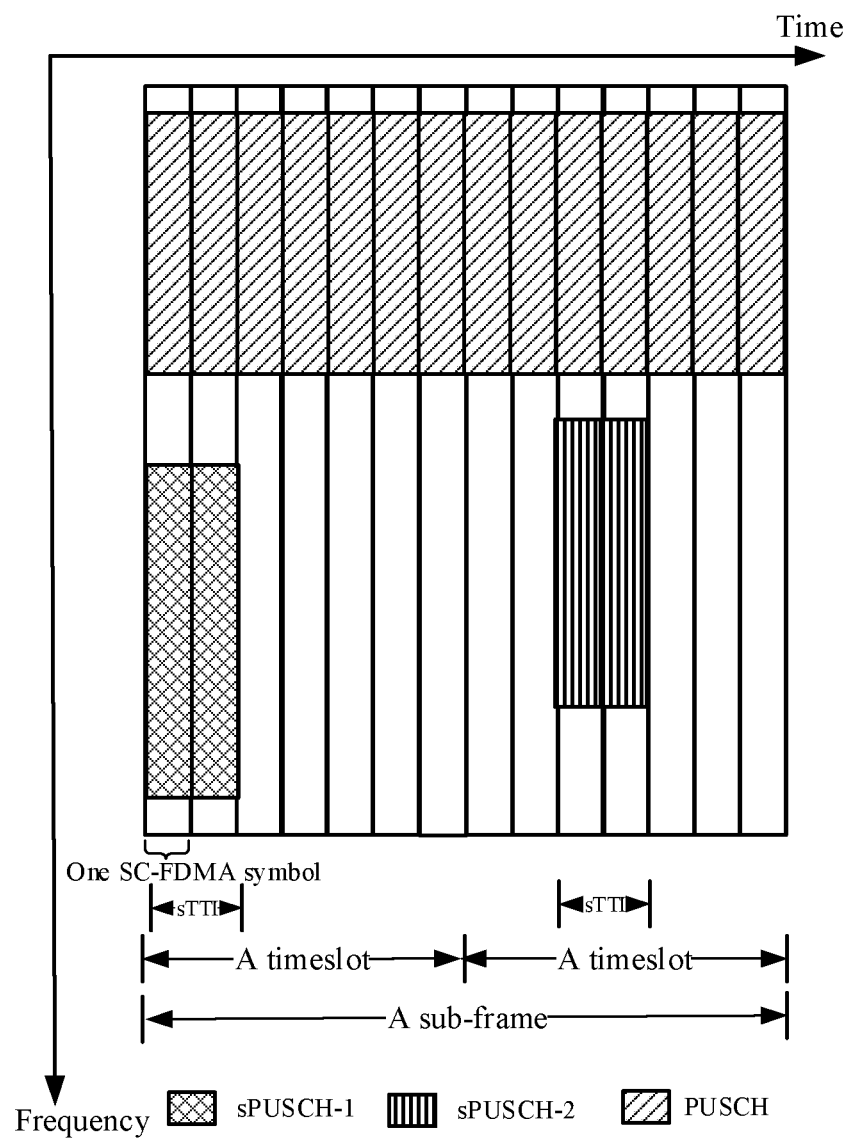
FIG. 7 is a schematic diagram of a fourth instance of overlapping transmission resources of transmission channels with different TTI lengths according to an embodiment of the application.

As illustrated in FIG. 7, if an sPUSCH-1 and an sPUSCH-2 overlap respectively with the PUSCH at different symbol positions in the current sub-frame, there is the same start time instant of the sPUSCH-1 and the PUSCH, and there are different start time instants of the sPUSCH-2 and the PUSCH, then: since there is the same start position of the sPUSCH-1 and the PUSCH, in one implementation, transmit power of the sPUSCH-1 will be maintained, and transmit power of the PUSCH will be reduced, according to a short-TTI-first principle until total power in the overlapping component does not exceed the highest transmit power allowable for the UE; and in another implementation, both transmit power of the sPUSCH-1, and transmit power of the PUSCH will be reduced by the same factor until total power in the overlapping component does not exceed the highest transmit power allowable for the UE; and since there are different start positions of the sPUSCH-2 and the PUSCH, transmit power of the PUSCH is maintained (at this time, the transmit power of the PUSCH is transmit power thereof after power in the component thereof overlapping with the sPUSCH-1 is controlled as described above), and transmit power of the sPUSCH-2 is reduced, according to a time-first principle until total power in the overlapping component does not exceed the highest transmit power allowable for the UE.

It shall be noted that the embodiment above relates to transmission in a short TTI of two symbols only by way of an example, but the same will apply to transmission in a short TTI of another symbol length; the uplink control channels overlapping in transmission in the embodiment above may be located over the same carrier, or may be located in different carriers among a plurality of carriers aggregated for the UE; and the same will apply to other instances of an sPUCCH/PUCCH/sPUSCH/PUSCH overlapping directly with each other, so a repeated description thereof will be omitted here.

Figure 8:
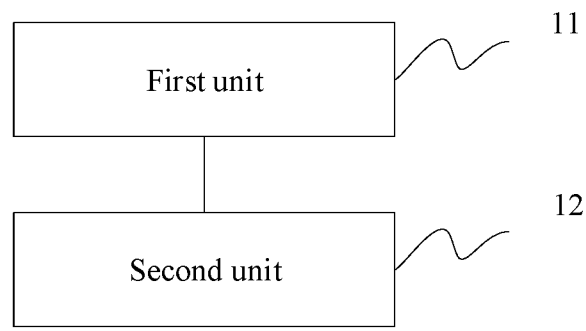
FIG. 8 is a schematic structural diagram of an apparatus for allocating power according to an embodiment of the application.

In correspondence to the method above, referring to FIG. 8, an apparatus for allocating power according to an embodiment of the application includes: a first unit 11 is configured to determine the sum of transmit power of a channel transmitted in a first TTI length, and a channel transmitted in a second TTI length in a sub-frame; and a second unit 12 is configured to allocate power under a preset rule when the sum determined by the first unit 11 exceeds the highest transmit power allowable for a UE, so that the sum does not exceeds the highest transmit power allowable for the UE.

In one embodiment the first TTI length is longer than the second TTI length.

In one embodiment the first TTI length is 1 ms, and the second length is less than 1 ms, or both the first TTI length and the second TTI length are less than 1 ms.

In one embodiment the channel transmitted in the first TTI length and the channel transmitted in the second TTI length are uplink channels.

In one embodiment the channel transmitted in the first TTI length is an uplink control channel or an uplink shared channel, and the channel transmitted in the second TTI length is an uplink control channel or an uplink shared channel.

In one embodiment the first unit 11 is configured to allocate transmit power preferentially for the channel transmitted in the first TTI length, and to reduce transmit power of the channel transmitted in the second TTI length; or to allocate transmit power respectively for the channel transmitted in the first TTI length, and the channel transmitted in the second TTI length according to a start time of the channel transmitted in the first TTI length, and a start time of the channel transmitted in the second TTI length, in the same sub-frame.

In one embodiment the first unit 11 configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame, to allocate transmit power preferentially for the channel with an earlier start time, and to reduce transmit power of the channel with a later start time; or to reuse a power control scheme in the PCM 2 with dual connectivity in the LTE Rel-12.

In one embodiment the first unit 11 configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is the same as the start time of the channel transmitted in the second TTI length, or the difference between the start time of the channel transmitted in the first TTI length, and the start time of the channel transmitted in the second TTI length is not larger than a preset threshold, in the same sub-frame: to allocate transmit power preferentially for the channel transmitted in the second TTI length, and to reduce transmit power of the channel transmitted in the first TTI length; or to reuse a PCM1 power control scheme with dual-connectivity in the LTE Rel-12; or to allocate power according to the PCM1 power control scheme with dual-connectivity in the LTE Rel-12 together with the priorities of the TTI lengths; or to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof.

In one embodiment the first unit 11 configured to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof is configured: when the type of the channel transmitted in the first TTI length is different from the type of the channel transmitted in the second TTI length, to allocate transmit power preferentially for the channel transmitted in the second TTI length, and to reduce transmit power of the channel transmitted in the first TTI length, or to allocate transmit power preferentially for an uplink control channel, and to reduce transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of the carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, to reduce transmit power of the channel transmitted in the first TTI length, and transmit power of the channel transmitted in the second TTI length by the same factor; or when the type of the channel transmitted in the first TTI length is the same as the type of the channel transmitted in the second TTI length, to reduce transmit power of the channel transmitted in the first TTI length, and transmit power of the channel transmitted in the second TTI length by the same factor, or to allocate transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of the carried UCI thereof.

In one embodiment for a channel for which transmit power is to be reduced, transmit power of all the symbols in the channel is reduced.

Figure 9:
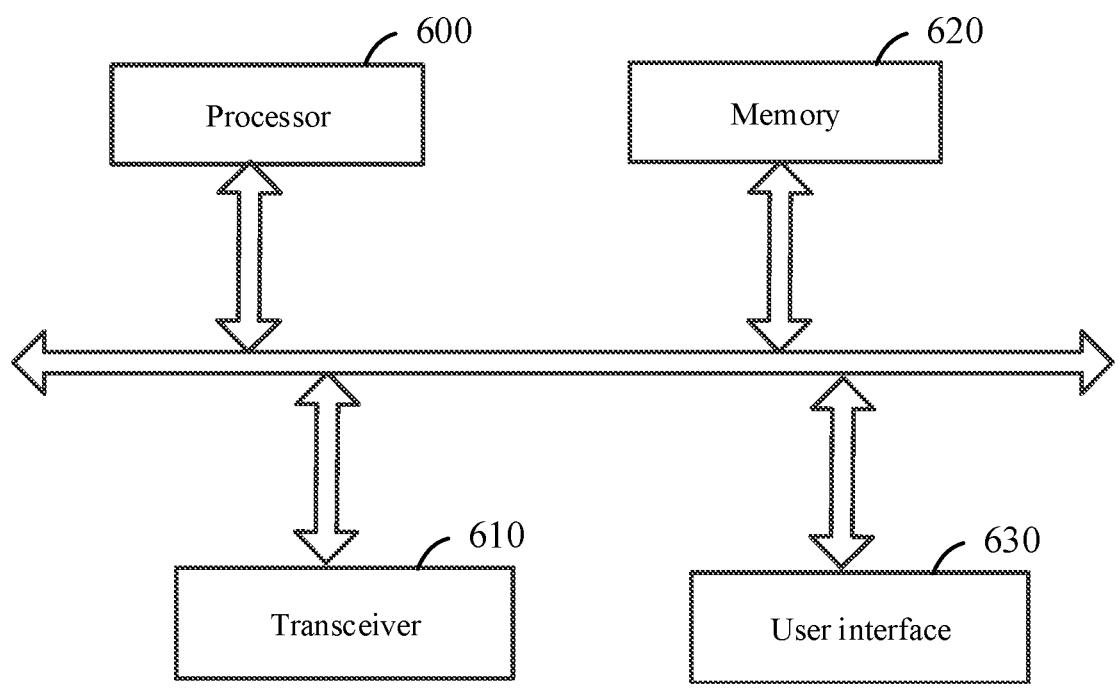
FIG. 9 is a schematic structural diagram of another apparatus for allocating power according to an embodiment of the application.

Referring to FIG. 9, another apparatus for allocating power according to an embodiment of the application, e.g., a UE, includes: a processor 600 is configured to read and execute program in a memory 620: to determine the sum of transmit power of a channel transmitted in a first TTI length, and a channel transmitted in a second TTI length in a sub-frame; and to allocate power under a preset rule when the sum exceeds the highest transmit power allowable for a UE, so that the sum does not exceeds the highest transmit power allowable for the UE.

In one embodiment the first TTI length is longer than the second TTI length.

In one embodiment the first TTI length is 1 ms, and the second length is less than 1 ms, or both the first TTI length and the second TTI length are less than 1 ms.

In one embodiment the channel transmitted in the first TTI length and the channel transmitted in the second TTI length are uplink channels.

In one embodiment the channel transmitted in the first TTI length is an uplink control channel or an uplink shared channel, and the channel transmitted in the second TTI length is an uplink control channel or an uplink shared channel.

In one embodiment the processor 600 configured to allocate power under the preset rule is configured: to allocate transmit power preferentially for the channel transmitted in the first TTI length, and to reduce transmit power of the channel transmitted in the second TTI length; or to allocate transmit power respectively for the channel transmitted in the first TTI length, and the channel transmitted in the second TTI length according to a start time of the channel transmitted in the first TTI length, and a start time of the channel transmitted in the second TTI length, in the same sub-frame.

In one embodiment the processor 600 configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame, to allocate transmit power preferentially for the channel with an earlier start time, and to reduce transmit power of the channel with a later start time; or to reuse a power control scheme in the PCM 2 with dual connectivity in the L Rel-12.

In one embodiment the processor 600 configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured: when the start time of the channel transmitted in the first TTI length is the same as the start time of the channel transmitted in the second TTI length, or the difference between the start time of the channel transmitted in the first TTI length, and the start time of the channel transmitted in the second TTI length is not larger than a preset threshold, in the same sub-frame: to allocate transmit power preferentially for the channel transmitted in the second TTI length, and to reduce transmit power of the channel transmitted in the first TTI length; or to reuse a PCM1 power control scheme with dual-connectivity in the LTE Rel-12; or to allocate power according to the PCM1 power control scheme with dual-connectivity in the LTE Rel-12 together with the priorities of the TTI lengths; or to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof.

In one embodiment the processor 600 configured to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof is configured: when the type of the channel transmitted in the first TTI length is different from the type of the channel transmitted in the second TTI length, to allocate transmit power preferentially for the channel transmitted in the second TTI length, and to reduce transmit power of the channel transmitted in the first TTI length, or to allocate transmit power preferentially for an uplink control channel, and to reduce transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of the carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, to reduce transmit power of the channel transmitted in the first TTI length, and transmit power of the channel transmitted in the second TTI length by the same factor; or when the type of the channel transmitted in the first TTI length is the same as the type of the channel transmitted in the second TTI length, to reduce transmit power of the channel transmitted in the first TTI length, and transmit power of the channel transmitted in the second TTI length by the same factor, or to allocate transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to the priorities of the carried UCI thereof.

In one embodiment for a channel for which transmit power is to be reduced, transmit power of all the symbols in the channel is reduced.

The transceiver 610 is configured to receive and transmit data under the control of the processor 600.

Here the processor 600, the memory 620, and the transceiver 610 in FIG. 9 can be connected over a bus, and the bus architecture) can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The transceiver 610 can be a number of elements, e.g., a number of transmitters and receivers, which are units for communication with various other devices over a transmission medium. For different user equipments, the user interface 630 can also be an interface via which devices can be connected internally and externally as needed, and the connected device include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

Optionally the processor 600 can be a Central Processing Unit (CPU), an Application-Specific Integrated Circuit (ASIC), a Field-Programmable Gate Array (FPGA), or a Complex Programmable Logic Device (CPLD).

In summary, different power allocation priorities or principles are defined in the embodiments of the application so that total power for concurrent short- and long-TTI transmission does not exceed the highest transmit power allowable for the UE.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for allocating power, the method comprising:
   determining the sum of transmit power of a channel transmitted in a first Transmission Time Interval (TTI) length, and a channel transmitted in a second TTI length in a sub-frame; and
   allocating power under a preset rule when the sum exceeds the highest transmit power allowable for a user equipment (UE), so that the sum does not exceeds the highest transmit power allowable for the UE;
   wherein the first TTI length is longer than the second TTI length;
   wherein the allocating power under the preset rule comprises:
   allocating transmit power respectively for the channel transmitted in the first TTI length, and the channel transmitted in the second TTI length according to a start time of the channel transmitted in the first TTI length, and a start time of the channel transmitted in the second TTI length, in the same sub-frame; and
   wherein the allocating transmit power respectively for the channel transmitted in the first TTI length, and the channel transmitted in the second TTI length according to the start time of the channel transmitted in the first TTI length, and the start time of the channel transmitted in the second TTI length, in the same sub-frame comprises:
   allocating transmit power respectively for the channel transmitted in the first TTI length, and the channel transmitted in the second TTI length, according to the type of the channel transmitted in the first TTI length and/or the type of carried Uplink Control Information (UCI) thereof, and the type of the channel transmitted in the second TTI length and/or the type of carried UCI thereof.

2. The method according to claim 1, wherein the first TTI length is 1 ms, and the second length is less than 1 ms, or both the first TTI length and the second TTI length are less than 1 ms.

3. The method according to claim 1, wherein the channel transmitted in the first TTI length and the channel transmitted in the second TTI length are uplink channels.

4. The method according to claim 3, wherein the channel transmitted in the first TTI length is an uplink control channel or an uplink shared channel, and the channel transmitted in the second TTI length is an uplink control channel or an uplink shared channel.

5. The method according to claim 1, wherein the allocating transmit power respectively for the channel transmitted in the first TTI length, and the channel transmitted in the second TTI length according to the start time of the channel transmitted in the first TTI length, and the start time of the channel transmitted in the second TTI length, in the same sub-frame comprises, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame:
   allocating transmit power preferentially for the channel with an earlier start time, and reducing transmit power of the channel with a later start time; or
   reusing a power control scheme in the Power Control Mode (PCM) 2 with dual connectivity in the Long Term Evolution (LTE) Rel-12.

6. The method according to claim 1, wherein allocating transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof comprises:

when the type of the channel transmitted in the first TTI length is different from the type of the channel transmitted in the second TTI length, allocating transmit power preferentially for the channel transmitted in the second TTI length, and reducing transmit power of the channel transmitted in the first TTI length, or allocating transmit power preferentially for an uplink control channel, and reducing transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, allocating transmit power respectively for the channel transmitted in the first TTI length, and the channel transmitted in the second TTI length according to priorities of carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, reducing transmit power of the channel transmitted in the first TTI length, and transmit power of the channel transmitted in the second TTI length by the same factor; or when the type of the channel transmitted in the first TTI length is the same as the type of the channel transmitted in the second TTI length, reducing transmit power of the channel transmitted in the first TTI length, and transmit power of the channel transmitted in the second TTI length by the same factor, or allocating transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, allocating transmit power respectively for the channel transmitted in the first TTI length, and the channel transmitted in the second TTI length according to priorities of carried UCI thereof.

7. The method according to claim 1, wherein for a channel for which transmit power is to be reduced, reduce transmit power of all the symbols in the channel.

8. An apparatus for allocating power, the apparatus comprising a processor, a memory, and a transceiver, wherein the transceiver is configured to receive and transmit data under the control of the processor, the memory is configured to store preset program, and the processor is configured to read and execute the program in the memory:

to determine the sum of transmit power of a channel transmitted in a first Transmission Time Interval (TTI) length, and a channel transmitted in a second TTI length in a sub-frame; and to allocate power under a preset rule when the sum exceeds the highest transmit power allowable for a user equipment (UE), so that the sum does not exceeds the highest transmit power allowable for the UE;

wherein the first TTI length is longer than the second TTI length;

wherein the processor is configured to allocate transmit power respectively for the channel transmitted in the first TTI length, and the channel transmitted in the second TTI length according to a start time of the channel transmitted in the first TTI length, and a start time of the channel transmitted in the second TTI length, in the same sub-frame; and wherein the processor configured to allocate transmit power respectively for the channel transmitted in the first TTI length, and the channel transmitted in the second TTI length according to the start time of the channel transmitted in the first TTI length, and the start time of the channel transmitted in the second TTI length is further configured:

to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length and/or the type of carried UCI thereof.

9. The apparatus according to claim 8, wherein the first TTI length is 1 ms, and the second length is less than 1 ms, or both the first TTI length and the second TTI length are less than 1 ms.

10. The apparatus according to claim 8, wherein the channel transmitted in the first TTI length and the channel transmitted in the second TTI length are uplink channels.

11. The apparatus according to claim 10, wherein the channel transmitted in the first TTI length is an uplink control channel or an uplink shared channel, and the channel transmitted in the second TTI length is an uplink control channel or an uplink shared channel.

12. The apparatus according to claim 8, wherein the processor configured to allocate transmit power respectively for the channel transmitted in the first TTI length, and the channel transmitted in the second TTI length according to the start time of the channel transmitted in the first TTI length, and the start time of the channel transmitted in the second TTI length, in the same sub-frame is configured, when the start time of the channel transmitted in the first TTI length is different from the start time of the channel transmitted in the second TTI length, or the difference between the start time of the channel transmitted in the first TTI length, and the start time of the channel transmitted in the second TTI length is above a preset threshold, in the same sub-frame:

to allocate transmit power preferentially for the channel with an earlier start time, and to reduce transmit power of the channel with a later start time; or to reuse a power control scheme in the Power Control Mode (PCM) 2 with dual connectivity in the Long Term Evolution (LTE) Rel-12.

13. The apparatus according to claim 8, wherein the processor configured to allocate transmit power respectively for the channel transmitted in the first TTI length, and the channel transmitted in the second TTI length, according to the type of the channel transmitted in the first TTI length and/or the type of carried UCI thereof, and the type of the channel transmitted in the second TTI length, and/or the type of carried UCI thereof is configured:

when the type of the channel transmitted in the first TTI length is different from the type of the channel transmitted in the second TTI length, to allocate transmit power preferentially for the channel transmitted in the second TTI length, and to reduce transmit power of the channel transmitted in the first TTI length, or to allocate transmit power preferentially for an uplink control channel, and to reduce transmit power of an uplink shared channel; or when the type of the channel transmitted in the first TTI length is different from the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to priorities of carried UCI thereof; or when the type of the channel transmitted in the first TTI length is different from the type of the channel transmitted in the second TTI length, and the type of UCI carried in the channel transmitted in the first TTI length is the same as the type of UCI carried in the channel transmitted in the second TTI length, to reduce transmit power of the channel transmitted in the first TTI length, and transmit power of the channel transmitted in the second TTI length by the same factor; or when the type of the channel transmitted in the first TTI length is the same as the type of the channel transmitted in the second TTI length, to reduce transmit power of the channel transmitted in the first TTI length, and transmit power of the channel transmitted in the second TTI length by the same factor, or to allocate transmit power preferentially for the channel transmitted in the second TTI length; or when the type of the channel transmitted in the first TTI length is the same as the type of the channel transmitted in the second TTI length, and the type of UCI carried in the channel transmitted in the first TTI length is different from the type of UCI carried in the channel transmitted in the second TTI length, to allocate transmit power respectively for the channel transmitted in the first TTI length, and the channel transmitted in the second TTI length according to priorities of carried UCI thereof.

14. The apparatus according to claim 8, wherein for a channel for which transmit power is to be reduced, reduce transmit power of all the symbols in the channel.

* * * * *